(12) United States Patent
McAlpine et al.

(10) Patent No.: US 7,903,552 B2
(45) Date of Patent: *Mar. 8, 2011

(54) DIRECTIONAL AND PRIORITY BASED FLOW CONTROL MECHANISM BETWEEN NODES

(75) Inventors: Gary L. McAlpine, Banks, OR (US); Tanmay Gupta, Hillsboro, OR (US); Manoj K. Wadekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/276,207

(22) Filed: Nov. 21, 2008

(65) Prior Publication Data

US 2009/0073882 A1 Mar. 19, 2009

Related U.S. Application Data

(63) Continuation of application No. 10/957,895, filed on Sep. 30, 2004, now Pat. No. 7,457,245.

(51) Int. Cl.
*H04L 1/00* (2006.01)
(52) U.S. Cl. .......... 370/230; 370/235; 370/412
(58) Field of Classification Search .......... 370/229, 370/230, 235, 412–418, 428, 429, 445
See application file for complete search history.

(56) References Cited

U.S. PATENT DOCUMENTS

| | | | |
|---|---|---|---|
| 5,379,297 A | 1/1995 | Glover | |
| 5,910,955 A | 6/1999 | Nishimura et al. | |
| 6,091,709 A | 7/2000 | Harrison et al. | |
| 6,134,218 A | 10/2000 | Holden | |
| 6,721,273 B1 | 4/2004 | Lyon | |
| 6,778,546 B1 | 8/2004 | Epps et al. | |
| 2002/0141427 A1 | 10/2002 | McApline | |
| 2003/0016685 A1 | 1/2003 | Berggreen | |

OTHER PUBLICATIONS

"CMSG Problem Statement: Where We Started and Where We Are", *Congestion Management Study Group Meeting*, Jul. 13-15, 2004, Portland OR, (Jul. 13, 2004), 8 pages.

(Continued)

*Primary Examiner* — Ricky Ngo
*Assistant Examiner* — Pao Sinkantarakorn
(74) *Attorney, Agent, or Firm* — Blakely, Sokoloff, Taylor & Zafman LLP

(57) ABSTRACT

A node uses a two dimensional array of transmit queues to store frames to be transmitted from the node to another node. The size of the array is governed by the number of directions to which the other node may forward frames once received from the node, and the number of priorities that may be associated with the frames. The transmit queues are distinguished from each other based on direction and priority. A transmitter transmits frames dequeued from the transmit queues to the other node. Control logic that controls the transmit queues receives an indication from the other node whether the other node is experiencing traffic congestion in any of the directions and the priority of frames at or below which the control logic is to control the dequeuing of frames from transmit queues corresponding to the directions in which the other node is experiencing traffic congestion.

8 Claims, 2 Drawing Sheets

OTHER PUBLICATIONS

"Congestion Management 101 . . . or mabe 551/2", *Congestion Management Study Group Meeting*, Jul. 13-15, 2004, Portland OR, (Jul. 13, 2004), 29 pages.

"Congestion Management in a Bladed System", *Congestion Management Study Group Meeting*, May 24-25, 2004, (May 24, 2004), 5 pages.

"IEEE 802.1G", *1998 Edition, Part 5: Remote Media Access Control (MAC) Briding*, (1998), 221 pages.

"IEEE 802.1H", *1997 Edition, Part 5: Media Access Control (MAC) Briding of Ethernet V2.0 in Local Area Networks*, (1997), 18 pages.

"IEEE 802.1Q", *2003 Edition, Virtual Bridged Local Area Networks*, (2003), 312 pages.

"IEEE 802.1X-2001, Port-Based Network Access Control", (2001), 134 pages.

"IEEE 802.3 Congestion Management Study Group July Plenary Report", *Congestion Management Study Group Meeting*, Jul. 13-15, 2004, Portland OR, (Jul. 13, 2004), 14 pages.

"IEEE 802.3 IF-1993", *IEEE Standards for Local and Metopolitan Area Networks; Common Definitions and Procedures for IEEE 802 Management Information*, (1993), 39 pages.

"IEEE 802.3ae-2002, Part 3: Carrier Sence Multiple Access with Collision Detection (CSMA/CD) Access Method and Physical Layer Specifications", *Amendment: Media Access Control (MAC) Parameters, Physical Layers, and Management Parameters for 10 Gb/s Operation*, (2002), 516 pages.

"International Report on Patentability", PCT/US2005/035410, mailed Apr. 12, 2007, 9 pages.

"International Search Report and Written Opinion", PCT/US2005/035410, mailed Feb. 14, 2006, 11 pages.

"Joint Objectives list—few thoughts", *Congestion Management Study Group Meeting*, Sep. 27-28, 2004, Ottawa CA, (Sep. 27, 2004), 5 pages.

"Problem Space for Ethernet Congestion Management", *Congestion Management Study Group Meeting*, Sep. 27-28, 2004, Ottawa CA, (Sep. 27, 2004), 35 pages.

ASI SIG, "Advanced Switching Core Architecture Specification", *Revision 1.0*, Dec. 2003, 366 pages.

Ayandeh, et al., "IEEE 802/3 Flow Control Baseline Requirements", *Congestion Management Study Group Meeting*, Jul. 13-15, 2004, Portland OR, (Jul. 13, 2004), 11 pages.

Aydemir, et al., "Flow Control in Gbs Ethernet Networks", *IBM*, Nov. 11, 1998, 31 pages.

Barrass, et al., "Problem Space for Ethernet Congestion Management", *Congestion Management Study Group Meeting*, Sep. 27-28, 2004, Ottawa CA, (Sep. 27, 2004), 32 pages.

Booth, "Ethernet Congestion Management", *Congestion Management Study Group Meeting*, Sep. 27-28, 2004, Ottawa CA, (Sep. 27, 2004), 14 pages.

Daines, "1:1 Oversubscription", *Congestion Management Study Group Meeting*, Sep. 27-28, 2004, Ottawa CA, (Sep. 27, 2004), 12 pages.

Finn, "VLANs Classes of Service and Flows", *Congestion Management Study Group Meeting*, Jul. 13-15, 2004, Portland OR, (Jul. 13, 2004), 19 pages.

Grow, "The Structure for Congestion Management,", *Congestion Management Study Group Meeting*, May 24-25, 2004, Long Beach CA, (May 24, 2004), 13 pages.

Gupta, et al., "TCP/IP Modeling for Congestion Management", *Congestion Management Study Group Meeting*, Jul. 13-15, 2004, Portland OR, (Jul. 13, 2004), 16 pages.

Hedge, et al., "IEEE Congestion Management—Presentation for IEEE Congestion Management Study Group", *Congestion Management Study Group Meeting*, May 24-25, 2004, Long Beach CA, (May 24, 2004), 16 pages.

Lynskey, "Preemption Simulations", *Congestion Management Study Group Meeting*, May 24-25, 2004, (May 24, 2004), 10 pages.

Martin, "A Survey of Standards Efforts on Traffic & congestion Management in Ethernet Networks", *Congestion Management Study Group Meeting*, May 24-25, 2004, Long Beach CA, (May 24, 2004), 14 pages.

Thaler, "Congestion Spreading—The Dark Side of LInk-Based Congestion Control", *Congestion Management Study Group Meeting*, Sep. 27-28, 2004, Ottawa CA, (Sep. 27, 2004), 10 pages.

Thatcher, "Congestion Management (CM)—Managing the Layer Stack", *Congestion Management Study Group Meeting*, May 24-25, 2004, Long Beach CA, (May 24, 2004) 44 pages.

Wadekar, et al., "Rate Control in Short Range 802.3 Interconnects", *Congestion Management Study Group Meeting*, Sep. 27-28, 2004, Ottawa CA, (Sep. 27, 2004), 21 pages.

Wadeker, et al., "Proposal for 802.3 Enhancements for Congestion Management", *Congestion Management Study Group Meeting*, May 24-25, 2004, Long Beach CA, (May 24, 2004), 23 pages.

Wadeker, et al., "Proposal for CM Enhancements in 802.3", *Congestion Management Study Group Meeting*, Jul. 13-15, 2004, Portland OR, (Jul. 13, 2004), 14 pages.

"Office Action for Taiwan Application No. 94134069 dated Feb. 4, 2009.", Whole Document.

DIRECTIONAL AND PRIORITY BASED FLOW CONTROL MECHANISM BETWEEN NODES

This application is a continuation of U.S. application Ser. No. 10/957,895 filed on Sep. 30, 2004, entitled Directional and Priority Based Flow Control Mechanism Between Nodes, currently allowed, which claimed the benefit of U.S. Provisional Application Ser. No. 60/607,892, filed on Sep. 7, 2004, entitled Directional Rate Control for Switched Interconnects.

TECHNICAL FIELD

The invention generally relates to the field of data communications. In particular, the invention relates to controlling traffic congestion between communicating nodes on the basis of direction and priority of traffic flows.

BACKGROUND

A node communicating with another node via a communication medium may use a single transmit, or port, queue for buffering frames of data to be transmitted from an output port (for example, an input/output port or outlet) of the node to the other node. Alternatively, a node may use multiple transmit queues for buffering the frames of data, wherein each frame of data is selected to be stored in one of the transmit queues based on some criteria such as type, class or quality of service associated with the frame, or data in the frame.

In any case, if frames of data are received at the node faster than the frames can be transmitted to the other node, the transmit queue or queues begin to fill up with frames. Generally, recently received frames wait in the queue while frames received ahead of them in the queue are first transmitted, resulting in what is known as "head of line" blocking, since frames at the head of the transmit queue block other frames in the queue from being transmitted. The period of time a frame remains in the queue increases the overall period of time it takes for the frame to be transmitted between the nodes. This increase in time taken to transmit a frame from one node to another node in a network setting generally is referred to as network latency.

If a transmit queue in a node fills up and cannot accept any further frames, any additional frames received at the node may be discarded. Applications executing on the respective nodes may be communicating with each other and may time out, or hang waiting for data to arrive from the other node, or detect the loss or absence of data that was discarded and request the data be retransmitted. Latency and retransmission negatively affect throughput and bandwidth of the communication medium over which the nodes communicate.

The approaches discussed above generally do not provide enough transmit queues for non-blocking throughput in a node or a network. One approach is to provide separate transmit queues for each traffic flow transmitted by a node. A traffic flow may be defined as related frames of data transmitted between two nodes during a session between instances of respective applications executing on the nodes. Given there may be multiple instances of multiple applications executing on each node, and multiple sessions between these instances, the number of transmit queues needed for this approach is not easily determined, if not unbounded.

A simple form of controlling flow of frames ("flow control") between nodes occurs when one or more transmit queues in a node fills with frames to the point the node discards frames that would otherwise be transmitted to another node. Essentially, this type of flow control is binary in manner—either a frame is transmitted or it is not. Another form of flow control involves a node ("the receiving, or destination, node") that is, or is becoming, congested sending a message, for example, a pause frame, to another node ("the transmitting, or source, node") from which it is receiving frames. The message instructs the transmitting node to stop transmitting frames to the receiving node for a selected short period of time, or until another message is sent from the receiving node to the transmitting node instructing the transmitting node to begin transmitting frames again.

The latter type of flow control is used, for example, between nodes in Ethernet networks adhering to the Institute for Electrical and Electronic Engineers (IEEE) 802.3 standard for the CSMA/CD (Carrier Sense Multiple Access/Collision Detection) protocol, including Ethernet, operating in full-duplex mode over Fast Ethernet (100 Mbps), Gigabit Ethernet (1000 Mbps), and the IEEE 802.3ae standard (10 Gigabit Ethernet). See IEEE 802.3-2002: IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specifications, and IEEE 802.3ae-2002: IEEE Standard for Carrier Sense Multiple Access with Collision Detection (CSMA/CD) Access Method and Physical Layer Specifications-Media Access Control (MAC) Parameters, Physical Layer and Management Parameters for 10 Gb/s Operation for further information on use of flow control in Ethernet networks.

These flow control techniques do not take into consideration different destinations to which the receiving node forwards frames, once received, nor distinguish between different priorities or classes of service associated with frames. Moreover, if a congested node uses flow control, a node that transmits frames to the congested node may, in turn, become congested and use flow control. In this way, congestion can cascade back through a network of nodes (referred to as congestion spreading).

DETAILED DESCRIPTION

Figure 1:
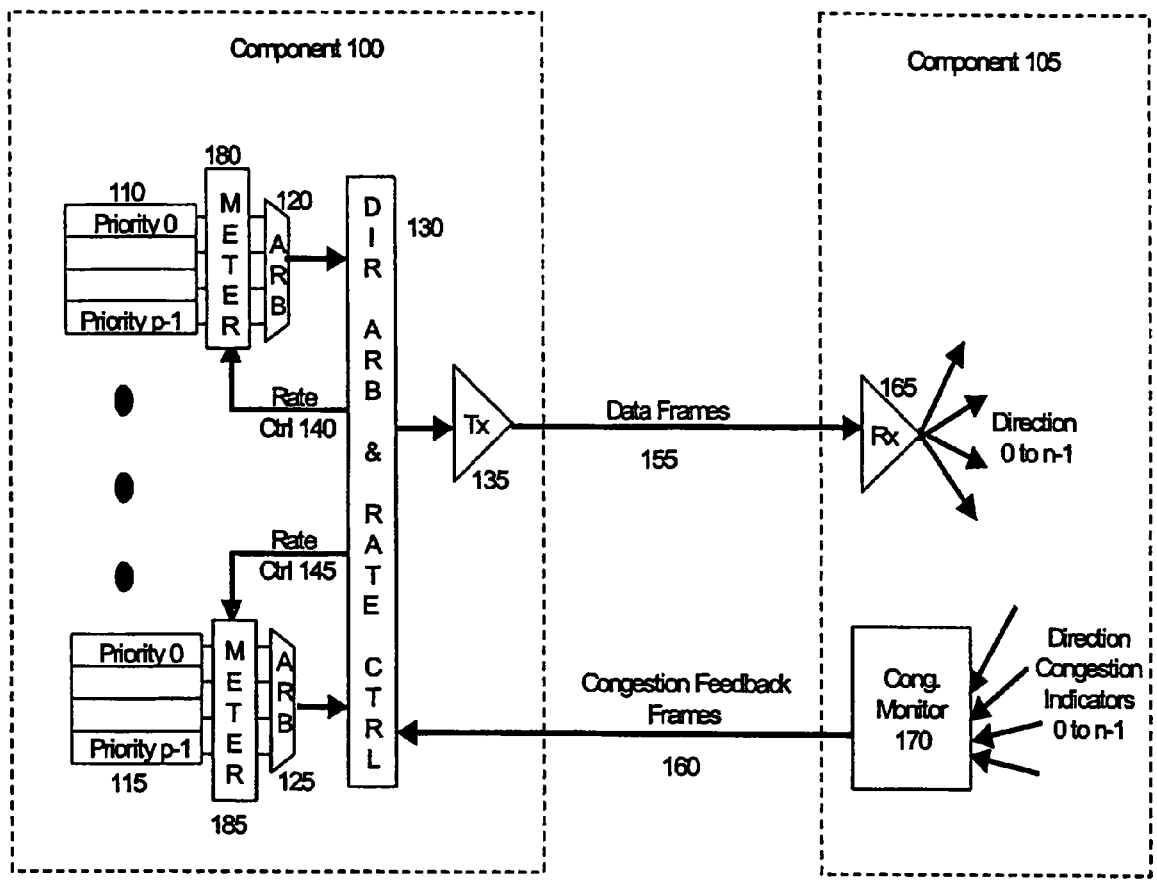
FIG. 1 is a block diagram of an embodiment of the invention.

The invention uses a transmit queue structure and control logic in a transmitting or source component to dynamically control the rate at which frames of data are transmitted to a receiving or destination component based on the directions in which the receiving component is experiencing congestion, and based on the priority of queued frames. The queue structure includes a two dimensional array of transmit queue paths, or simply, transmit queues, associated with a transmitter in the transmitting component. The directions in which the receiving component may forward frames, once received from the transmitting component, governs one dimension of the array. The number of possible priorities that can be assigned to the frames governs the other dimension of the array.

The receiving component provides feedback to the control logic in the transmitting component. The feedback indicates whether congestion exists in any of the directions to which the receiving component is to transmit frames from the transmitting component, once the frames are received. This feedback is used by the control logic in the transmitting component to control the rate at which frames destined for congested directions are transmitted. Further, the feedback indicates the priority of frames to which to the control logic applies this rate control.

The term component is purposely used in the above description of the invention because it is generic, as it is contemplated the invention may be utilized in many different computing and communications environments. A component may be, for example, an Ethernet network interface card, an end user computing system or host with a network interface card, a network switching device, a blade in a chassis of a network switching device, a chipset, a processor, a network processor, a server in a cluster of interconnected servers, a node in a switching fabric, a switching device in a telecommunications network, a base station, or a wireless computing and/or communications device. Further, in the following description and claims, where a reference to a specific type of component is used, such as node, it should be appreciated that another type of component may be substituted without departing from the spirit and scope of the invention.

Like components, or dissimilar components with perhaps different functionality or different computing and communication capabilities, may utilize the invention. For example, the source component may be a processor, while the destination component may be a network interface card. Likewise, while the description may refer to one type of component as a source component and another type of component as a destination component, if full duplex communication is available between the components, each component may act as both a source and a destination component, depending on the direction(s) of traffic.

The source component transmits frames of data to the destination component over a communication medium. The medium may be an Ethernet link, a backplane, an input/output interface and/or bus, a switching fabric, a trace on a printed circuit board, or a wireless or radio frequency communication channel. Furthermore, it may be possible a communication medium combines some of the characteristics of these communication mediums, for example, a backplane may operate as an Ethernet backplane, or an Ethernet link may be a wireless Ethernet link.

The term "direction", used throughout the description and claims, is an abstraction of a set of resources, or a logical path to a set of resources, within or reachable by the receiving, or destination, component. For example, a switching device may have a number of input/output (I/O) ports, for example, 16 I/O ports. Each I/O port of the switching device could forward frames to any of the 15 other I/O ports—each of the 15 I/O ports represents a different direction. Likewise, if the component is an end user computing system with an Ethernet Media Access Controller (MAC), there may be multiple different multiprotocol stacks or other resources within the computing system for which the MAC provides communication services. The MAC, upon receiving frames of data, can forward the frames to different resources. In this scenario, each of the protocol stacks or other resources represents a different direction.

Thus, in one embodiment of the invention, a direction defines a logical path over a communication medium for which the rate of frames transmitted over the path can be individually controlled, separate from other logical paths, from the transmitting component. Controlling the rate of frame transmission avoids congesting a set of target resources at the receiving component, and allows bandwidth on the communication medium to be used by other, non-congested, directions. By rate controlling individual directions, only the flow of frames for congested directions is affected—frames destined for other directions can flow freely.

The component on the receiving end of the communications medium determines the number of directions or logical paths supported over the communications medium. If the component on the transmitting end of the communications medium supports a greater number of transmit queues than directions recognized by the receiving component, only those directions recognized by the receiving component are used. If, on the other hand, the transmitting component supports a lesser number of transmit queues than the directions recognized on the receiving component, then multiple directions supported by the receiving component may be grouped or mapped to particular transmit queues on the transmitting component.

FIG. 1 provides a block diagram of an embodiment of the invention. A source or transmitting component 100 transmits frames of data over a communications medium 155 to a destination or receiving component 105. Source 100 may have one or more output interfaces or ports, each with a transmitter 135. Each transmitter has an associated array of transmit queues providing a separate queuing path for each traffic priority and direction that data frames can be forwarded by a peer input port or receiver 165 of the destination, or next-hop, component 105. For example, source 100 includes sets of transmit queues 110, 115, each set of queues to store frames destined to a specific direction to which receiver 165 can forward the frames, once received over link 155. Each set of queues, in turn, is defined by separate queue paths based on different priorities, e.g., priority 0 through priority p−1.

Each output interface of a transmitting component includes a scheduler that controls the rate of transfer of frames from each of the transmit queues and arbitrates between the queues for transmission of frames over the associated communication medium linking the transmitting component to a receiving component. In FIG. 1, the scheduler comprises logic control block 130, which receives direction and priority specific congestion indications from congestion monitor 170 over link 160 and determines, based thereon, those queues to rate control via signals 140, 145. Control logic block 130 arbitrates among the sets of queues, each set associated with a direction, from which to dequeue frames for transmission to the receiving component, using an arbitration scheme. It should be appreciated that link 160 may be a logical path that shares the same physical communication medium over which data frames are transmitted, or may be a separate, out-of-band, communication medium dedicated to transmitting control frames including, for example, congestion indications, from the receiving component.

The scheduler further comprises priority arbiters 120, 125 to arbitrate among the different priority transmit queues associated with a particular direction, based on priority, and meters 180, 185 to delay eligibility of the transmit queues associated with the particular direction, based on their priority, to participate in the arbitration performed by arbiters 120, 125. Meters 180, 185 receive rate control instructions via respective rate control lines 140, 145 from control logic 130 to determine when and for how long to deny a particular priority transmit queue eligibility to participate in the arbitration performed by arbiters 120, 125. In this manner, control logic 130, arbiters 120, 125 and meters 180, 185 control the rate at which frames of a certain priority are transmitted to a particular direction, for example, a congested direction reachable via receiver 165 of component 105.

Figure 2:
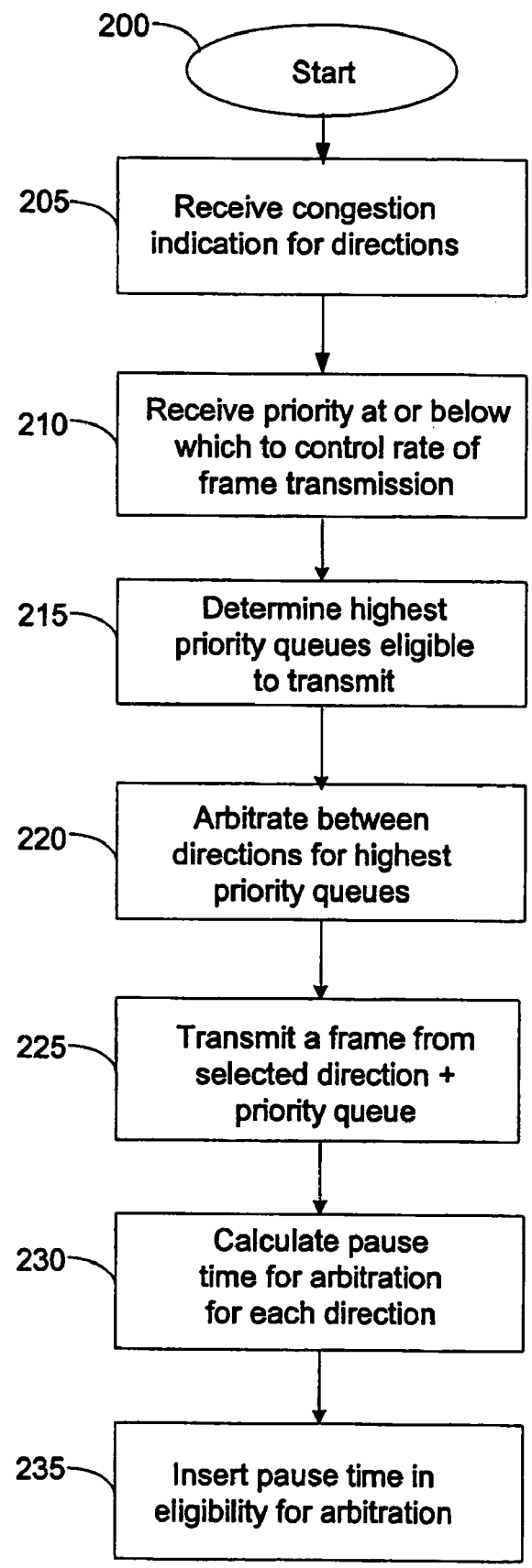
FIG. 2 is a flow diagram of an embodiment of the invention.

FIG. 2 provides a flow diagram of the process for controlling the rate of frame transmission for a particular destination and specific priority of frames, using the components illustrated in FIG. 1 and as discussed above. The process starts at 200 with the assumption that at least some of the transmit queues have frames of data queued and ready to be transmitted. In particular, frames are queued by both priority and the direction the frames will be forwarded by receiving component 105, once the frames are received. At 205, component 100 receives a congestion feedback frame from congestion monitor 170 in component 105 via path 160. The congestion feedback frame includes N indicators, 0 to n−1, indicating the directions to which receiving component 106 may forward frames that are congested, if any. In one embodiment of the invention, an IEEE 802.3x MAC Control sublayer frame may be used to communicate this congestion information. In one embodiment of the invention, a multibit field is provided in the frame for each direction to indicate the degree of congestion for that particular direction, or the rate of change of congestion for that direction. For example, the field may contain a value that indicates no congestion, a level of congestion, increasing congestion, or decreasing congestion.

As another example, status is tracked by component 105 for each direction to which receiver 165 forwards frames. This status information may indicate whether congestion exists in a particular direction, and/or whether the rate that frames are transmitted to the receiver for forwarding in that direction should be controlled. In one embodiment, based on this status information, the multibit field may indicate a percentage by which to throttle up or down the rate at which frames are transmitted in a particular direction. In one embodiment of the invention, successive congestion indication frames may increase or decrease the percentage by which the transmitting component throttles transmitting frames in a particular direction.

At 210, component 100 receives an indication of the priority at or below which component 100 is to control the rate at which frames are transmitted to the directions experiencing congestion. In one embodiment of the invention, an M-bit mask is provided to indicate the priorities of frames that component 100 should rate control. The priority may be indicated in the same congestion feedback frame as transmitted in 205, or a separate congestion feedback frame that contains, for example, the M-bit mask. In one embodiment of the invention, only the lowest priority frames are rate controlled, unless the amount of higher priority frames to be transmitted is sufficient to cause congestion in the receiving component.

The control logic block 130 uses the directional congestion indicators and the priorities indicator to control the order and rate at which separate transmit queues are serviced. The control logic block determines at 215 the highest priority queues eligible from which to select frames for transmitter 135 to transmit, and at 220 arbitrates between the directions for the highest priority queue from which to transmit. Once the highest priority queue is selected for a particular direction, at 225 a frame is dequeued from the selected queue and transmitted by transmitter 135 to receiver 165.

After transmitting a frame from the set of queues for a selected direction at 225, the maximum rate of frame transmission to each direction is controlled at 235 by inserting a period of time, or pause, in the eligibility for arbitrating for transmission of frames from the set of transmit queues for that direction that are enabled for rate control by the priority mask. The priorities not enable for rate control are eligible for arbitration immediately. In one embodiment of the invention, the period of time is calculated at 230 based on the size of the frame last transmitted, and a current rate factor, for the direction.

A current rate factor is maintained for each direction. The current rate factor increases in response to an increase in congestion, or congestion remaining high, in the corresponding direction. The current rate factor decreases in response to a decrease in congestion in the corresponding direction, or congestion remaining low. In one embodiment of the invention, the minimum current rate factor is zero, indicating no congestion in the corresponding direction, or rate control being disabled for that direction. The current rate factor is determined based on the degree of, and/or variance in, congestion, as indicated by the received congestion feedback indication frames.

In one embodiment of the invention, a set of priority transmit queues for a particular direction may be eligible for arbitration for transmission of a frame, even if a pause in eligibility for arbitration is in effect for the set of priority queues for that direction. As discussed above, rate control only is applied to the priorities indicated in the priority bit mask of a congestion feedback frame. Thus, the pause in eligibility only is applied to those priority transmit queues with the corresponding bit in the priority bit mask set to 1. Only the highest priority transmit queue eligible to dequeue a frame for transmission to a particular direction participates in arbitration for transmission. The arbitration for transmission selects the highest eligible priority and fairly arbitrates between directions with queues at that priority ready to transmit frames.

In one embodiment of the invention, the period of time to pause is controlled by inserting an interpacket gap (IPG) at the transmit queue outputs (see, e.g., meters 180, 185) after transmission of each frame from the set of priority transmit queues for the direction last selected by arbitration. The size of the IPG, in one embodiment of the invention, is governed by the value of the corresponding congestion indication for that direction. Receiving, for example, multiple successive congestion indications for a particular direction may increase the IPG size. In one embodiment of the invention, the size of the IPG is calculated based on one or more of the following criteria: the size of the frame last transmitted, priority, and the current rate factor for the direction. A minimum IPG is zero, and can occur when the congestion indication for a particular direction indicates no congestion, or the priority mask bit for the frame's priority is zero, or rate control is disabled.

Note that while component 100 only illustrates the transmit queues, transmitter and control logic to transmit frames from the component to component 105, and while component 105 only illustrates the receiver and congestion indication feedback logic, each component may well include all of these elements, for example, to provide for two-way communication between the components. However, it is appreciated that the block diagram and related description is sufficient for purposes of providing a description of the invention that would enable one of ordinary skill in the art to make and use the claimed invention.

The invention can be used in a cluster of nodes each interconnected by Ethernet links, wherein the nodes support switching of multiple different upper layer protocols (ULPs), the ULPs each possibly supporting many separate flows and multiple classes of service. One or more of the flows may be related and/or mapped to one or more different directions, as that term is defined herein, and one or more of the classes of service may be related and/or mapped to the possible priorities for which separate transmit queues are provided for each direction.

A priority field in an IEEE 802.1Q tag may support multiple differentiated traffic classes through which many different traffic types may be aggregated. (See IEEE 802.1Q—Virtual LANs for further detail re priority field). The priorities associated with the set of transmit queues for each direction support many different aggregates of a given traffic class to provide quality of service functionality over a network such as the Internet. Upper layer protocol policies for scheduling between different classes of service may utilize the congestion feedback provided by an embodiment of the invention described and claimed herein to optimize traffic flows. In one embodiment of the invention, the nodes provide the rate control and scheduling of frames described herein to enable upper layer protocols to support traffic profiles.

In this regard, each output interface of a node provides a separate transmit queue path for each traffic class for each direction traffic can be sent from a destination node, once received. Routing information in a routing database contains both a source node output identifier and a destination node (or next-hop node) direction identifier. These identifiers, along with a value from an IEEE 802.1p field in a header of a frame can be used to select the appropriate output interface and one of its transmit queues. (See IEEE 802.1P—Traffic Class Expediting and Dynamic Multicast Filtering for further information re 802.1p header format).

A direction, as that term is understood herein, is not discernable from the perspective of a transmitting node communicating over an Ethernet link to a receiving node because there is no field in a header of an Ethernet frame to indicate the direction. A direction is relative to the receiving node at the other end of the Ethernet link. The receiving node determines the various directions, discerns the set of resources defined by each direction, and can associate a direction with a destination MAC address. The associations need to be conveyed to the source component, and can be accomplished, for example, by an IEEE 802.3 link level self configuration and learning process that supports automatic discovery and association of directions with MAC addresses.

It should be appreciated that reference throughout this specification to "one embodiment" or "an embodiment" means that a particular feature, structure or characteristic described in connection with the embodiment is included in at least one embodiment of the invention. Therefore, it is emphasized and should be appreciated that two or more references to "an embodiment" or "one embodiment" or "an alternative embodiment" herein are not necessarily all referring to the same embodiment. Furthermore, the particular features, structures or characteristics may be combined as suitable in one or more embodiments of the invention.

What is claimed is:

1. In a node, a method for controlling transmission of a frame, comprising:
   queuing into one of a plurality of transmit queues a frame to be transmitted from the node over a communication medium to another node, the transmit queue distinguished from the other transmit queues based on:
      to where the other node will forward the frame, once received, and
      a priority associated with the frame;
   receiving a communication indicating:
      whether the other node is experiencing traffic congestion to where the other node forwards frames, and
      a priority of frames at and/or below which the node is to control transmission to the other node in the event of traffic congestion; and
   determining an order in which the plurality of transmit queues become eligible for arbitrating the transmission of the frame from the transmit queue responsive to the communication, wherein transmit queues containing frames with higher priorities become eligible before transmit queues containing frames with the same or lower priorities than the indicated priority at and/or below which the node is to control transmission;
   for transmit queues containing frames with the same or lower priorities than the indicated priority at and/or below which the node is to control transmission, regulating a maximum rate of the transmission of the frames when they become eligible for arbitration based on a current rate factor maintained for the other node, the current rate factor based on a tracked congestion status tracked by where the other node forwards frames, the tracked congestion status indicating whether congestion exists for where the other node forwards frames and/or whether the current rate factor maintained for the other node is subject to control, wherein upon receipt of successive communications indicating that the other node is experiencing traffic congestion to where the other node forwards frames, the tracked congestion status further indicates one of an increase or decrease of a percentage by which to throttle up or down the current rate factor maintained for the other node.

2. The method of claim 1, wherein the communication indicating whether the other node is experiencing traffic congestion to where the other node forwards frames includes indicating whether the other node is experiencing traffic congestion at an output port of the other node.

3. The method of claim 1, wherein the communication indicating whether the other node is experiencing traffic congestion to where the other node forwards frames includes indicating whether the other node is experiencing traffic congestion at a set of resources within the other node to which a receiver in the other node forwards frames.

4. The method of claim 3, wherein the set of resources comprises a protocol stack operating in the other node.

5. The method of claim 1, wherein the communication indicating whether the other node is experiencing traffic congestion to where the other node forwards frames indicates an Institute for Electrical and Electronic Engineers (IEEE) 802.3 Media Access Control (MAC) address associated with a node to which the other node forwards frames.

6. The method of claim 1, wherein regulating the maximum rate of transmission of the frames when they become eligible for arbitration based on the current rate factor maintained for the other node includes delaying eligibility for arbitration by a period of time, the delay period of time calculated based on a size of the frame last transmitted to the other node and forwarded to where the other node is experiencing congestion.

7. The method of claim 1, wherein the current rate factor maintained for the other node is based on a received congestion status in the received communication indicating whether the other node is experiencing traffic congestion to where the other node forwards frames, the received congestion status indicating one of no congestion, a level of congestion, an increasing congestion and a decreasing congestion.

8. The method of claim 7, wherein the received congestion status in the received communication indicating whether the other node is experiencing traffic congestion to where the other node forwards frames further indicates a percentage by which to throttle up or down the current rate factor maintained for the other node.

* * * * *